United States Patent
Weitz

[15] 3,659,933
[45] May 2, 1972

[54] ANNOTATOR FOR MICROFILM READER

[72] Inventor: Harry Weitz, New Hyde Park, N.Y.
[73] Assignee: Boxton-Beel, Inc., Brooklyn, N.Y.
[22] Filed: Aug. 11, 1970
[21] Appl. No.: 62,789

[52] U.S. Cl. ............................................353/44, 353/21
[51] Int. Cl. ...................................................G03b 21/00
[58] Field of Search .......................353/44, 21, 122; 346/21; 219/201; 352/90, 56, 130

[56] References Cited

UNITED STATES PATENTS

| | | | |
|---|---|---|---|
| 3,395,204 | 7/1968 | Walter | 353/21 X |
| 1,406,507 | 2/1922 | Tuttle | 346/76 X |

Primary Examiner—Harry N. Haroian
Attorney—Michael Ebert

[57] ABSTRACT

An annotator adapted to erase any selected line of text or a part of the line appearing on a reduced image formed on a microfilm strip of thermoplastic material which is transported within a microfilm reader for projection on a screen. The annotator includes a retractable carriage supporting a pair of electrodes whose ends are bridged by a resistance wire acting as a stylus. The carriage is movable by a stepping motor or other means to cause the stylus, whose length corresponds to the width of the frame, to advance incrementally across the film strip and in engagement therewith in a direction normal to the direction of film travel. The stylus is arrested at a position in registration with a line of text to be erased, the stylus and text being viewable on the screen whereby the registration may be readily checked. By electrically energizing the arrested stylus, the selected line is fused and erased.

6 Claims, 5 Drawing Figures

Patented May 2, 1972

FILM DIRECTION

STYLUS CARRAIGE DIRECTION

INVENTOR.
HARRY WEITZ
BY
ATTORNEY

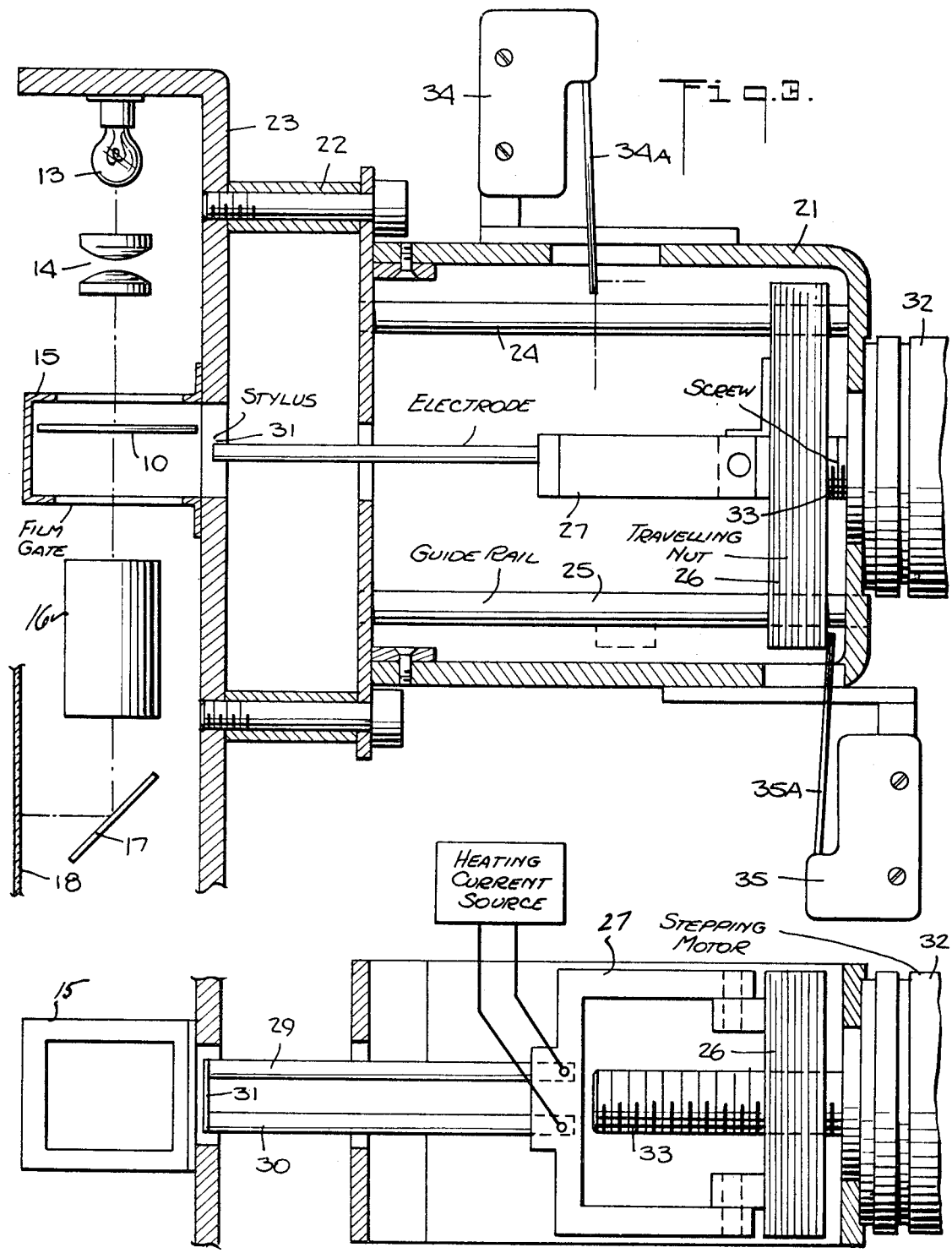

ANNOTATOR FOR MICROFILM READER

BACKGROUND OF THE INVENTION

This invention relates generally to microfilm readers and more particularly to an annotator for such readers, the annotator being adapted to erase any line of text in the film plane or a portion of said line.

In order to conserve storage space and afford a ready means for retrieving information, it is now common practice to photograph documents, records, books and various forms of technical data in a sharply reduced scale on microfilm. Conventionally, a micro-image of each book page or document is recorded on a separate frame on a microfilm roll. To view the recorded data, the roll is inserted in a reader or optical projector, the film being advanced to place a selected frame into the projection window whereby an enlarged and readable image is cast on a screen.

Where the microfilm records the text of a document, it is often necessary to be able to erase a line of the text or a portion of the line. Various techniques have heretofore been proposed for this purpose. In one method, a punch is provided which is capable of stamping out a portion of the text. In another method, the film is chemically etched. It has also been proposed to use a hot die which engages the film, the head of the die fusing the thermoplastic film to erase a portion of the text.

All of these prior techniques for film annotation entail relatively elaborate mechanisms that have certain practical disadvantages. In arrangements adapted to punch out or hot-die stamp a reduced image on microfilm, it is difficult to orient the punch or die precisely with the miniature area to be erased. In chemical etching, one must exercise great care to ensure that the chemicals do not overrun the area to be erased, and one must allow adequate time for the chemicals to take effect.

Moreover, in all prior techniques, the annotator cannot be incorporated in the standard microfilm transport system, but requires a special annotator arrangement wherein the film is brought into a treatment zone separate from the optical system of the film projector. It is not possible, therefore, to view the annotating operation at the same time the film is being viewed in the projector.

SUMMARY OF INVENTION

Accordingly it is the primary object of this invention to provide an annotator for a standard microfilm projector, which annotator is so incorporated therein that one may view the annotating operation at the same time the microfilm is being viewed.

More specifically, it is an object of the invention to provide an annotator wherein a heated stylus is adapted to engage any selected line or portion of a line of microfilm text in the film plane, and wherein the annotator can be brought in and out of the viewing plane while the microfilm is in transport.

Yet another object of the invention is to provide an annotator which may be manufactured at low cost and which is reliable and efficient in operation.

Also an object of the invention is to provide an annotator which may be used in conjunction with a convertible microfilm reader adapted to view either a film strip or a microfiche card, the annotator being readily removable from the reader, or left in the reader if it is required for microfiche projection.

Briefly stated, these objects are accomplished by an annotator which includes a retractable carriage which is shiftable with respect to the film gate of an optical reader, the carriage supporting a pair of electrodes whose ends are bridged by a resistance wire acting as a stylus. The carriage is operated by a stepping motor, a stepping relay or equivalent means which acts to advance the stylus incrementally across the film strip in engagement with the surface thereof. The length of the stylus corresponds to the width of a frame or a part thereof on the strip, the stylus being arrested at a position in registration with the line of text on the frame to be erased. The stylus and text are viewable on the screen of the reader, and by electrically energizing the arrested stylus, the line engaged thereby is fused and erased.

OUTLINE OF THE DRAWING

For a better understanding of the invention, as well as other objects and further features thereof, reference is made to the following detailed description to be read in conjunction with the accompanying drawing, wherein:

FIG. 4 is a plan view of the annotator; and

FIG. 5 shows the relationship between the annotator stylus and a selected line of the projected microfilm frame.

DESCRIPTION OF THE INVENTION

Figure 1:
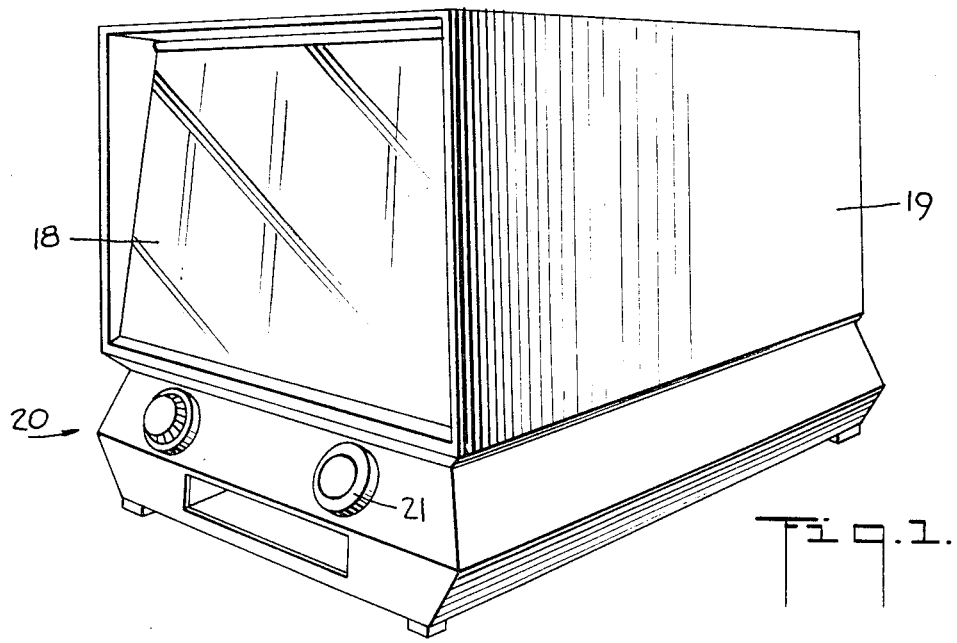
FIG. 1 is a perspective view of a typical microfilm reader.

Referring now to FIG. 1, there is shown an optical reader of standard design for enlarging and projecting images contained on the strip of a microfilm inserted in the reader. The strip is wound on an endless reel in self-contained cartridge form or in reel-to-reel form whereby the film on a supply reel is wound on a take-up reel.

Figure 2:
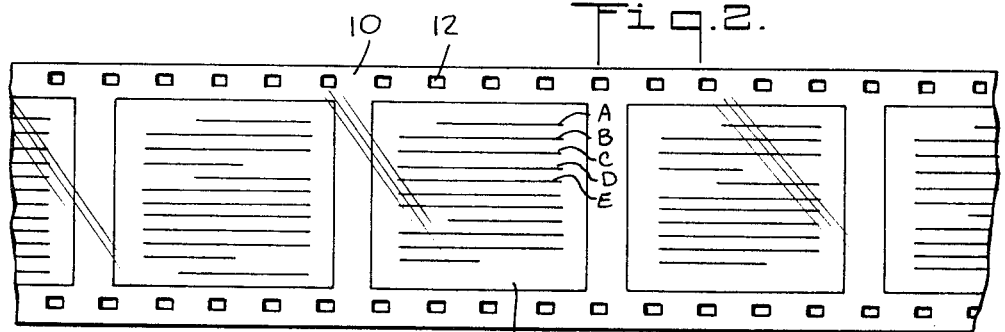
FIG. 2 illustrates a portion of a microfilm strip.

The microfilm 10, as shown in FIG. 2, is in strip form, a micro-image of each sheet of the document or book which is recorded being contained on a separate frame, such as frame 11. To facilitate the transport of the film, sprocket holes 12 may be provided along the margins thereof, or the film may be engaged by suitable rollers or other means to effect the advance thereof in a desired direction.

Figure 3:
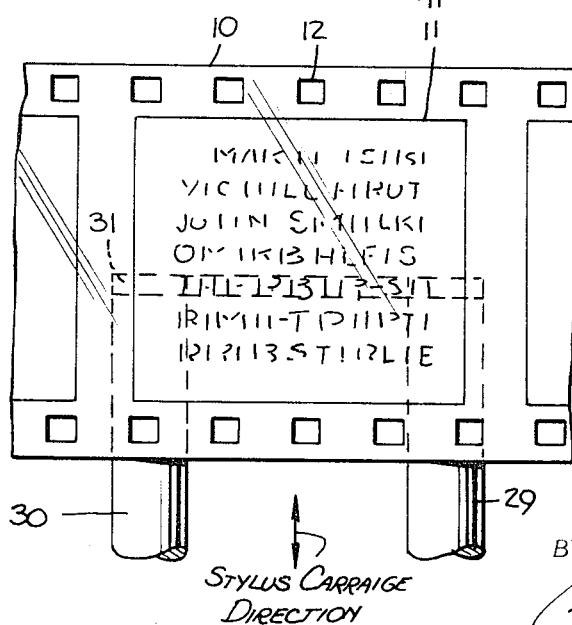
FIG. 3 is an end view of an annotator in accordance with the invention which is incorporated in the microfilm reader.

The mechanical details of the reader are not the concern of the present invention since any standard reader construction is usable. Optically the reader, as shown in FIG. 3, includes a light source 13 whose rays are concentrated by a condenser 14 onto the frame of the microfilm 10 which lies within a film gate 15, the illuminated image of the frame being enlarged by a lens barrel 16 and projected onto a reflector 17. Reflector 17 casts the enlarged image onto a light-permeable rear-projection viewing screen 18 mounted on the front of the casing 19 of the reader, as shown in FIG. 1.

The microfilm reader 20 includes a control knob 20 for operating the transport mechanism to advance the microfilm one frame at a time for projection and viewing. Thus one sitting before the screen of the reader is able to view and read the enlarged text of the projected frame.

Frame 11 of the microfilm strip, as shown in FIG. 2, is constituted by an image of a printed text having horizontal lines A, B, C, D, etc. The function of the annotator is to erase any one of these lines or a portion thereof, and to do so while the frame is being viewed on screen 18. Thus the operator is able to align the annotator with a selected line and to see erasure being carried out so that he is sure that the proper line or portion thereof is being treated.

The annotator in accordance with the invention comprises a frame 21 which is supported by suitable bolts 22 on a bracket 23 in the optical reader, on which bracket is mounted the film gate 15. Slidably mounted on frame 21 along a pair of guide rails 24 and 25 is a retractable carriage constituted by a traveling nut 26 and an electrode holder 27.

Supported on holder 27 is a pair of insulated electrodes 29 and 30 which are disposed in parallel relation. Bridged across the ends of the electrodes is a resistance wire 31 of very small diameter, the length of the wire corresponding to the width of a microfilm frame 10 or to a portion thereof, depending upon the intended function of the annotator, as will be later explained. Wire 31, when electrically energized, serves as a stylus to fuse and erase a line of text engaged thereby. The diameter of the wire is about equal to the width of a line of optically reduced text on the image frame.

As best seen in FIG. 3, the electrodes supporting stylus 31 are advanced by the carriage to carry the stylus through an opening in bracket 23, the stylus moving within film gate 15 to engage the undersurface of microfilm strip 10. As the stylus moves across the film, it is successively aligned with the lines of text in the film frame as shown in FIG. 5.

The carriage movement is controlled by a miniature stepping motor 32, a stepping relay or equivalent means, mounted on frame 21. Stepping motor 32, when energized by electrical pulses, moves one step per pulse in a direction determined by the polarity of the pulses. Motor 32 drives a screw 33 which threadably engages the traveling nut 26 of the carriage such that when the screw turns in one direction, the carriage is moved forward to advance stylus 31 toward one edge of film 10, the stylus moving across the film in engagement with the undersurface thereof until it approaches the other edge of the film, at which point the movement is reversed and the carriage retracts the stylus. It is to be noted that the carriage bearing the stylus moves in a direction which is normal to the direction of film movement in the reader.

The limits of this movement are controlled by a forward travel-limiter 34 and a rear travel-limiter 35, both in the form of microswitches having actuating levers 34A and 35A, respectively. When actuating lever 34A engages traveling nut 36, the associated microswitch is actuated to cause stepping motor 32 to cease operation, and when the nut, in the return direction, thereafter strikes actuating lever 35A, the associated microswitch is actuated to cause the motor to cease operation in the reverse direction.

In operation, the stepping motor is caused to advance the stylus across a frame of interest being projected, until the stylus 31 is in registration with the line to be erased, as shown in FIG. 5. At this point the motor is arrested, and a switch (not shown) is closed to pass current through the electrodes to electrically energize the stylus bridged thereacross. The stylus fuses the line in alignment therewith, thereby erasing the line. This entire operation is viewable on the screen, for both the stylus and the text are projected thereon.

Where one wishes to erase only a portion of a line, the length of the stylus is made much shorter than the width of a microfilm frame. Then when the stylus is brought into registration with a selected line of text, one may move the film strip in the appropriate direction to cause the stylus to scan and erase as much of the line as one desires.

In some instances, the same reader is used for projecting microfiche cards wherein microfilm frames, instead of appearing sequentially along a film strip, are mounted in an array on a transparent card. When such cards are projected in a reader, it is necessary to remove the film gate, in that, for microfiche operation, there is no film transport mechanism but only a device for shifting the card in rectangular coordinates to place a particular frame in the optical path of the system. Since the film gate and the annotator are both mounted on a common bracket, it becomes a simple matter to convert the reader to microfiche operation, for one merely removes the bracket and the components carried thereby.

In some instances, one may use the annotator in a microfiche reader, for if the reader is provided with a carriage which is adapted to move the microfiche in the X-Y direction with respect to the optical axis of the projector which runs in the Z direction in order to register a selected microfiche frame with the optical axis, the annotator may be arranged to traverse the selected frame to erase any line or portion thereof.

While there have been shown and described preferred embodiments of the invention, it will be appreciated that many changes and modifications may be made therein without, however, departing from the essential spirit of the invention.

I claim:

1. An annotator for a microfilm reader, said reader having an optical projector for casting an enlarged image of a microfilm frame positioned within a film gate onto a viewing screen, said annotator comprising:
   A. a retractable carriage having an electrode holder for supporting a pair of spaced electrodes,
   B. a resistance wire bridged across the ends of said electrodes to define a stylus,
   C. means to drive said carriage to advance said stylus into said film gate across said film frame in engagement with the surface thereof, said drive means operating incrementally whereby said stylus, whose length corresponds to the width of said frame or to a portion thereof, may be registered with any selected line of text on said frame, and
   D. means to energize said stylus to heat same to effect fusion of the line aligned therewith, thereby to erase the line.

2. An annotator as set forth in claim 1, wherein said retractable carriage includes a traveling nut supported on guide rails, said nut being threadably engaged by a screw which is turned in either direction by said drive means.

3. An annotator as set forth in claim 1, wherein said reader includes means to advance said frame in a direction normal to the direction of carriage movement, and wherein said stylus length is less than the width of said frame, whereby a desired portion of said selected line may be erased by advancing said frame.

4. An annotator as set forth in claim 2, wherein said drive means is a stepping motor or a stepping relay.

5. An annotator as set forth in claim 3, wherein said carriage movement is limited in the forward and return directions by limit switches which are engaged by said nut and which, when actuated, cause cessation of said motor.

6. An annotator as set forth in claim 1, wherein said film gate and the components constituting said annotator are mounted on a common bracket to facilitate removal thereof from the reader.

* * * * *